US009357109B2

(12) United States Patent
Hyers

(10) Patent No.: US 9,357,109 B2
(45) Date of Patent: May 31, 2016

(54) MAGNETIC OPTICAL ADAPTER FOR ELECTRONIC DEVICES

(71) Applicant: Carson Optical, Inc., Hauppauge, NY (US)

(72) Inventor: Michelle Hyers, Hicksville, NY (US)

(73) Assignee: Carson Optical, Inc., Hauppauge, NY (US)

( * ) Notice: Subject to any disclaimer, the term of this patent is extended or adjusted under 35 U.S.C. 154(b) by 177 days.

(21) Appl. No.: 13/917,190

(22) Filed: Jun. 13, 2013

(65) Prior Publication Data

US 2014/0368731 A1    Dec. 18, 2014

(51) Int. Cl.
*H04N 5/225* (2006.01)
*G02B 7/02* (2006.01)

(52) U.S. Cl.
CPC .............. *H04N 5/2252* (2013.01); *G02B 7/023* (2013.01); *H04N 5/2254* (2013.01)

(58) Field of Classification Search
CPC ........................... H04N 5/2254; H04N 5/2257
See application file for complete search history.

(56) References Cited

U.S. PATENT DOCUMENTS

| | | | |
|---|---|---|---|
| 3,896,463 A | 7/1975 | Laskey | |
| 5,208,624 A | 5/1993 | MacKay | |
| 5,708,874 A | 1/1998 | Schrock et al. | |
| 6,889,006 B2* | 5/2005 | Kobayashi | G02B 7/14 348/552 |
| 7,600,932 B2 | 10/2009 | Senba et al. | |
| 8,073,324 B2* | 12/2011 | Tsai | H01F 7/0247 359/827 |
| 8,253,787 B2 | 8/2012 | Yamamoto | |
| 8,279,544 B1* | 10/2012 | O'Neill | G02B 7/14 359/819 |
| 8,385,004 B2* | 2/2013 | Hicks | G03B 41/00 359/699 |
| D678,379 S | 3/2013 | O'Neill | |
| 2009/0109558 A1* | 4/2009 | Schaefer | G02B 7/02 359/827 |
| 2009/0143099 A1* | 6/2009 | Kang | G03B 17/14 455/556.1 |
| 2009/0181729 A1* | 7/2009 | Griffin, Jr. | H04N 5/2254 455/575.1 |
| 2010/0045773 A1 | 2/2010 | Ritchey | |
| 2010/0328420 A1* | 12/2010 | Roman | H04N 5/2251 348/14.08 |
| 2012/0236425 A1* | 9/2012 | O'Neill | G02B 7/14 359/827 |
| 2013/0002939 A1* | 1/2013 | O'Neill | G02B 7/14 348/360 |
| 2013/0135759 A1 | 5/2013 | O'Neill | |
| 2014/0071547 A1* | 3/2014 | O'Neill | G02B 7/02 359/827 |
| 2014/0313377 A1* | 10/2014 | Hampton | H05K 5/0217 348/241 |

FOREIGN PATENT DOCUMENTS

WO    WO0163355 A1    8/2001
WO    WO2006083081 A1    12/2010

OTHER PUBLICATIONS

Premier Systems USA, Inc Olloclip—Attachment A http://www.olloclip.com/ ("admitted prior art").

(Continued)

*Primary Examiner* — Lin Ye
*Assistant Examiner* — John H Morehead, III
(74) *Attorney, Agent, or Firm* — Carmody Torrance Sandak & Hennessey LLP

(57) ABSTRACT

The invention presented generally refers to an optical adapter device which magnetically attaches one or more optical elements or assemblies to a magnetic portion of an electronic device having a camera. In particular, the optical adapter is shaped to align a first opening in housing of the optical adapter with the camera of the electronic device. The novel device and method utilizes the inherently magnetic properties of the electronic device itself, instead of requiring a predetermined magnetic mate to be built into the electronic device.

20 Claims, 12 Drawing Sheets

(56) References Cited

OTHER PUBLICATIONS

Magneti/Detachable Wide Angle + Macro Lens—Attachment B http://www.usbfever.com/index_eproduct_view.php?products_id=789 ("admitted prior art").
Magnetic/Detachable Fish Eye Lens—Attachment C http://www.usbfever.com/index_eproduct_view.php?products_id=1555 ("admitted prior art").
Magnetic/Detachable Telephoto Lens—Attachment D http://www.usbfever.com/index_eproduct_view.php?products_id=790 ("admitted prior art").
The Clip-on Cell Lens—Attachment E http://photojojo.com/store/awesomeness/clip-on-cell-lenses/ ("admitted prior art").
Easy Macro Cell Lens Band—Attachment F http://photojojo.com/store/awesomeness/macro-lens-band/ ("admitted prior art").
The iPhone Telephoto Lens—Attachment G http://photojojo.com/store/awesomeness/iphone-telephoto-lens/ ("admitted prior art").
Holga iPhone Lens—Attachment H http://photojojo.com/store/awesomeness/holga-iphone-lens/ ("admitted prior art").
The iPhone Lens Dial—Attachment I http://photojojo.com/store/awesomeness/iphone-lens-dial/ ("admitted prior art").
The Dot iPhone Panorama Lens—Attachment J http://photojojo.com/store/awesomeness/iphone-dot-pano-lens/ ("admitted prior art").
The iPhone SLR Mount—Attachment K http://photojojo.com/store/awesomeness/iphone-slr-mount/ ("admitted prior art").

\* cited by examiner

MAGNETIC OPTICAL ADAPTER FOR ELECTRONIC DEVICES

BACKGROUND OF THE INVENTION

The present invention relates generally to the attachment of optical elements to the camera system of an electronic device. In particular, the present invention is directed to a novel and improved optical adapter device, which can magnetically connect an optical element or optical assembly to an electronic device having a camera and has a structure that provides for significant advantages over other options of optical adapters currently available.

Due to the prevalence of electronic devices with cameras, such as cellular phones or tablet computers, these electronic devices are being used with increasing frequency as the primary camera for photography uses. As a result, there is a growing need to customize and functionalize the camera with additional optical elements or optical assemblies like in a conventional DSLR camera. There had been several methods for attaching lenses or filters to traditional DSLR cameras (U.S. Pat. Nos. 3,896,463, 5,208,624) which have magnetic elements or features but these utilize the threaded portion of a DSLR camera or of the lens assembly for mounting the base element. For electronic devices such as cellular phones or tablet computers, such a threaded element or standardized lens mount as in DSLR cameras is not available. Therefore, there have been a variety of attachment means for connecting optical components to these electronic devices, but with notable drawbacks.

The prior art for other electronic devices with a camera is focused primarily on mechanical methods for the attachment of optical element or assembly to the main body of the electronic device. First, the most basic and commonly utilized solution is to create a custom case with one or more optical components. However, by utilizing a specific optical adapter case, the user is restricted to a very specialized case which may not suit their other requirements for protection, aesthetics and portability. As a result, the usage and the market for these highly specialized cases are minimal compared to a separate accessory item. The remaining mechanical methods require physical clamping of the adapter to or around the body of the electronic device, and as a result cover and/or touch some portion of the front surface of the electronic device. Since the display screen of these electronic devices normally occupies most of the front surface, these mechanical methods may cover a portion of the display screen thereby obstructing view of the camera's image (U.S. Pat. No. 8,385,004), and their physical contact with display screen risks causing damage. Another instance of mechanical adapter prior art is an adapter that uses a fixed clamping method (U.S. Pat. No. 8,279,544 B1). This had an additional disadvantage since it assumes a specific thickness of the device, which may not be identical if for example, the user is using a screen protector on their electronic device. In this common situation, the user would have to remove their screen protector each time to use such as fixed clamp style lens adapter, which is very inconvenient and may even damage the screen protector. Therefore, a solely mechanical method is not advantageous for connecting an optical component to an electronic device having a camera.

In regards to magnetic methods for an optical adaptor, there are several prior art examples of using a magnetic ring with a corresponding magnetic ring in the adapter. However, these methods require attachment of the base magnetic ring to the electronic device, which is typically accomplished by a bonding element such as glue or tape, which has the potential to leave residue on the electronic device. Most importantly, these prior art magnetic adaptors have no alignment means. The user has to attempt to physically align the magnetic element properly when bonding to the electronic device, so that the ring is concentric with the camera opening. If not properly aligned on the first try, the user may need to attempt to align several more times, which is not only frustrating but also may affect the strength of the bonding agent. The user may also not want to leave the magnetic ring permanently attached to their electronic device, thereby potentially requiring new bonding agent or magnetic rings each use and subsequently, more alignment steps. In summary, these magnetic prior art references require the user to align the lens assembly to the camera, which is time consuming and frustrating, and also risk leaving residue on the electronic device.

The invention presented herein demonstrates a lens adaptor adapter that provides a means to attach a lens to an electronic device, without requiring mechanical clamping that may block or damage the front surface of the electronic device, and without requiring user alignment steps or a bonding agent to attach the adapter to the electronic device.

SUMMARY OF THE INVENTION

The present invention relates generally to the attachment of optical elements to the camera system of an electronic device and in particular, by magnetic means that does not require an additional magnetic mate, but instead utilizes the inherently magnetic properties of the electronic device itself.

Electronic devices commonly have at least some portion with magnetic properties, such as the magnetic transducers in the speaker assembly, a metal trim around the outer profile or any other slightly magnetic region. Also, due to data storage becoming less frequently based upon magnetic storage methods, but instead using methods such as flash memory or solid state drives, in which data is not affected by magnetic fields, there is the ability to safely use magnets in electronic device accessories. Therefore, it is advantageous to have a device that exploits the inherently magnetic properties of the electronic device.

With empirical knowledge of the magnetic properties of a given electronic device having a camera, an adapter can be designed with a mating magnetic element that can magnetically attach to the electronic device. For an electronic device with a camera, such an adapter would ideally contain an optical element such as a lens, in order to modify the optical output of the built-in camera for added functionality. Furthermore, the optical adapter can be shaped to align the lens with the camera in the electronic device, such that no other alignment steps are required.

To overcome the perceived deficiencies in the prior art and to achieve the objects and advantages set forth above and below, the present invention is, generally speaking, a magnetic optical adapter that attaches directly to an electronic device.

Accordingly, it is an object of the present invention to provide a magnetic optical adapter for an electronic device having a camera that aligns the optical component to the camera.

It is a particular object of the present invention to provide a device that magnetically attaches an optical element or assembly to an electronic device without requiring a bonding agent.

It is yet another object of the present invention to provide a device that magnetically attaches a lens or lens assembly to an electronic device without necessarily requiring user alignment.

It is still another object of the present invention to provide a means of attaching an optical element or assembly to an electronic device having a camera without contacting the front surface of the electronic device.

Yet a further object of the present invention is to provide a means of attaching an optical element or assembly to an electronic device having a camera.

Still another object of the present invention is to provide a magnetic adapter that attaches to an electronic device having a camera, without any control over the design of the magnetic mating portions in the electronic device.

It is yet another object of the present invention to provide an optical adapter that can be designed to be used with or without a case on the electronic device.

Further objects and advantages of this invention will become more apparent from a consideration of the drawings and ensuing description.

In a preferred embodiment, an optical adapter for an electronic device having at least one camera and a display screen, the electronic device having a front surface that contains the display screen, a rear surface wherein the optical opening for the rear-facing camera system reside, the optical adapter comprising: at least one optical element or assembly, at least one magnetic element, wherein each magnetic element provides a magnetic connection between itself and a magnetic section of the electronic device, and a housing having an opening and having a cutout for each magnetic element, wherein the housing is shaped to align the opening with the optical axis of the rear-facing camera of the electronic device.

In a preferred method, one can attach a lens element to an electronic device having at least one camera and a display screen, the electronic device having a front surface that contains the display screen, a rear surface wherein the optical opening for the rear-facing camera system reside, using an optical adaptor comprising: at least one optical element or assembly element, at least one magnetic element, wherein each magnetic element provides a magnetic connection between itself and a magnetic section of the electronic device, and a housing having an opening and a cutout for each magnetic element, wherein the housing is shaped to align the opening with a camera of the electronic device.

The invention accordingly comprises the features of construction, combination of elements and arrangement of parts and sequence of steps which will be exemplified in the construction, illustration and description hereinafter set forth, and the scope of the invention will be indicated in the claims.

BRIEF DESCRIPTION OF THE DRAWINGS

For a fuller understanding of the invention, reference is had to the following description taken in connection with the accompanying figures, in which.

Like reference numerals in the various Figures illustrate like parts, but not every part in every figure is so identified.

DETAILED DESCRIPTION OF THE PREFERRED EMBODIMENT

As set forth in the Background Section above, and as will be appreciated below, the present invention is primarily directed to a magnetic optical adapter, and to the use of such a device with an electronic device having a camera. It should be noted that such an optical adapter presented in this invention has no access to the design or construction of the electronic device. The present invention uses inherent magnetic portions in electronic devices, whether designed unintentionally or intentionally by the manufacturer of the electronic device. Therefore, the use of an optical adapter presented herein does not restrict the magnetic mating portion of the electronic device to a specific design, pattern or structure, and consequently is not limited to a specific brand or type of electronic device. The optical adapter is designed to mate to an already existing electronic device, and does not providing any guide or schematic for a mating structure that must be included in the electronic device, in order for the optical adapter to be properly attached and aligned. The design of an optical adapter presented herein assumes some a posteriori knowledge of the magnetic portions of the electronic device. As a result, this invention is specifically directed to aftermarket optical accessories, utilizing the presented optical adapter structure.

Figure 1:
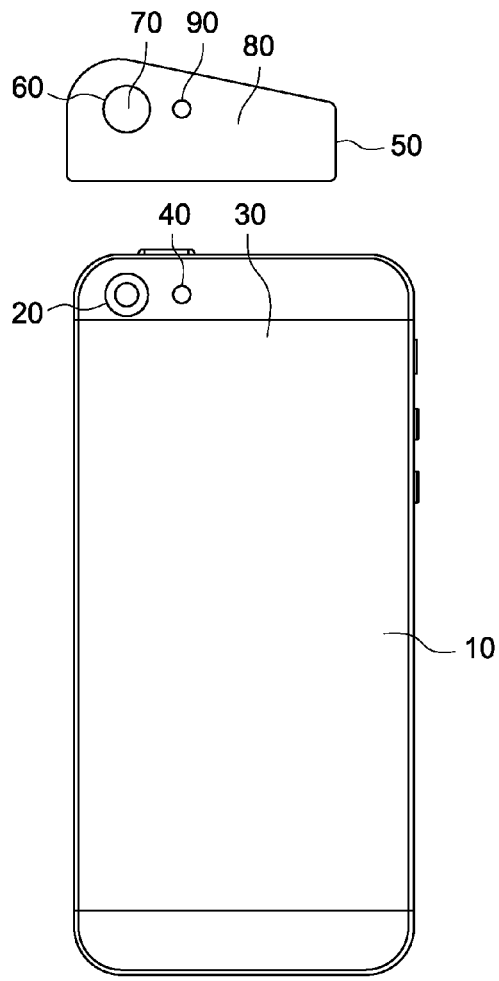
FIG. 1 is a front view of a first preferred embodiment of the present invention in close proximity to a cellular phone.
Figure 1A:
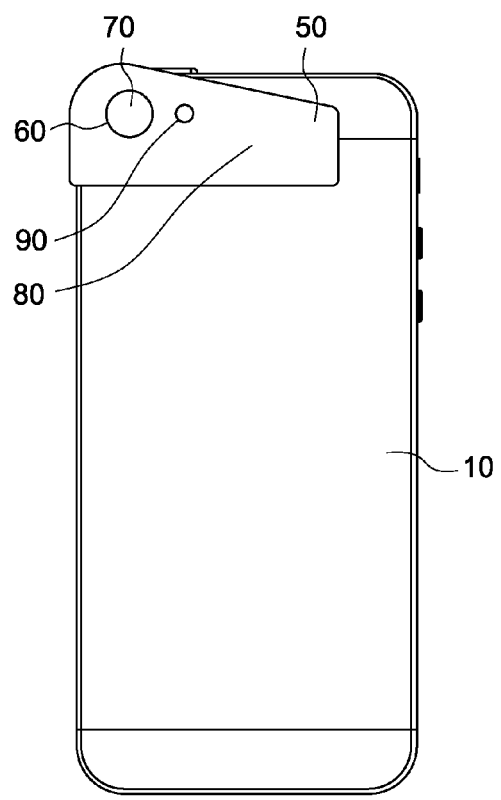
FIG. 1A is a front view of a first preferred embodiment of the present invention in a mated state with a cellular phone.

The optical adapter according to an embodiment of the present invention will be described hereinafter with reference to the drawings. FIG. 1 is a schematic of a first preferred embodiment of such an optical adapter with an illustrative electronic device 10, namely, a cellular phone, wherein the phone has a camera 20, a flash 40 and a known magnetic portion 30. The optical adapter has a housing 50, with an opening 60, an optical element or assembly 70, a magnet (on rear side) 80, and additional optional opening 90 that corresponds to the flash of the electronic device. The optical element or assembly includes but is not limited to the following or combination thereof: a lens, a lens assembly, a housing of a lens assembly, an optical filter, a polarizer, a mirror, a laser module, a lens hood, an iris, an anti-reflection device, fiber optics, a prism, a window, a diffuser, a curved membrane, a microlens arrays, a beamsplitter, an optical sensor, or a diffraction grating. The opening 60 in the housing has a central axis which defines the optical axis of the optical adapter. When the optical adapter is brought it into close contact with the electronic device, the magnet 80 will attract the magnetic portion 30 of the electronic device. In FIG. 1A, the optical adapter is shown in a mated state with the electronic device, so that the rear facing camera 20 is aligned with the opening 60 of the optical adapter, and the magnetic portion 30 is attached with the magnet 80 of the optical adapter. Furthermore, an optical element of assembly can be positioned in the housing with a set orientation and alignment, so that when the adapter is mated to the electronic device, the optical element can have an ideal orientation. For examples, for certain filters or polarizers, a specific orientation may be required or beneficial. Another variation is one in which the optical component is free to rotate in the opening such that the user could select and potentially set a specific orientation of the optical component.

A unique and significant feature of this magnetic optical adapter is that the magnet can be purposely placed at an offset from the mated position, so that the magnetic forces are pulling the adapter tight so as to provide a fitted contact with the corner of the electronic device. This offset magnetic force allows for nearly snap fit style connection, wherein the optical adapter is simply held over the electronic device in close proximity to the corner, and the device is automatically pulled into and held strongly in the properly aligned and mated condition. This feature allows for an almost effortless user experience to attach and align the optical adapter to the electronic device having a camera. It also prevents common disadvantages of mechanical adapters, including but not limited to requiring the user to forcefully push the adaptor onto the electronic device to ensure proper alignment. In addition, the optical adapter can have means for the user to easily reorientate the magnet, so as to change the polarity depending on the device or a certain model or version of the device. For example, one version of a cellular phone may not have the same polarity of the magnetic portion, which depends on the manufacturer and their specifications. In this type of situation, the polarity of magnetic elements in the optical adapter could be inverted by various means but not limited to the following: a door, a hinge, a snap fit connection, a press-fit, a bayonet style mount, or a set screw.

Figure 2:
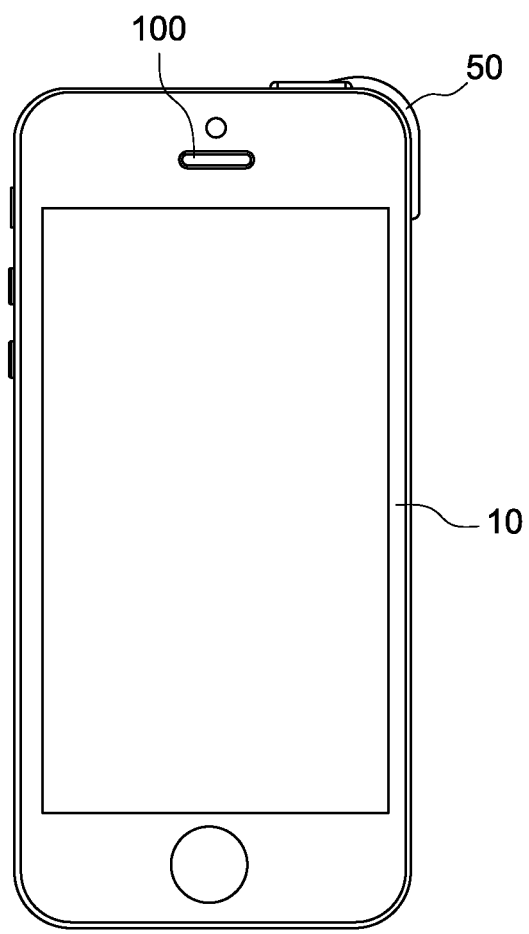
FIG. 2 is a back view of a first preferred embodiment of the present invention in a mated state with a cellular phone.
Figure 3:
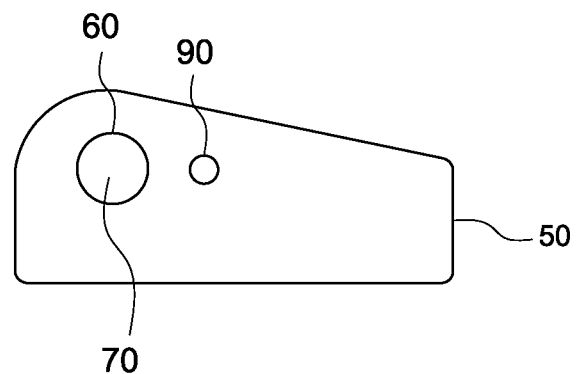
FIG. 3 is a top plan view of a first preferred embodiment of the present invention.

Another important feature of the present invention is that there is no covering or physical contact with the front surface of the electronic device required. As shown in FIG. 2, neither the housing 50, nor any portion of the optical adapter blocks or physically contacts the front surface of the electronic device. This optical adapter also does not assume any specific thickness of the electronic device, such that the user can use this adapter with any screen protector, whether it is a thin plastic film or a thicker glass style protector. Therefore, this present invention has notable advantages over all prior art examples.

Figure 4:
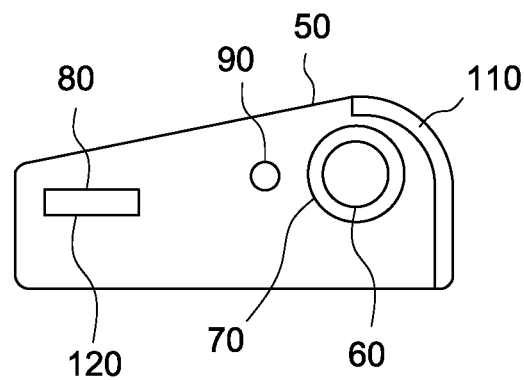
FIG. 4 is a back plan view of a second preferred embodiment of the present invention.
Figure 5:
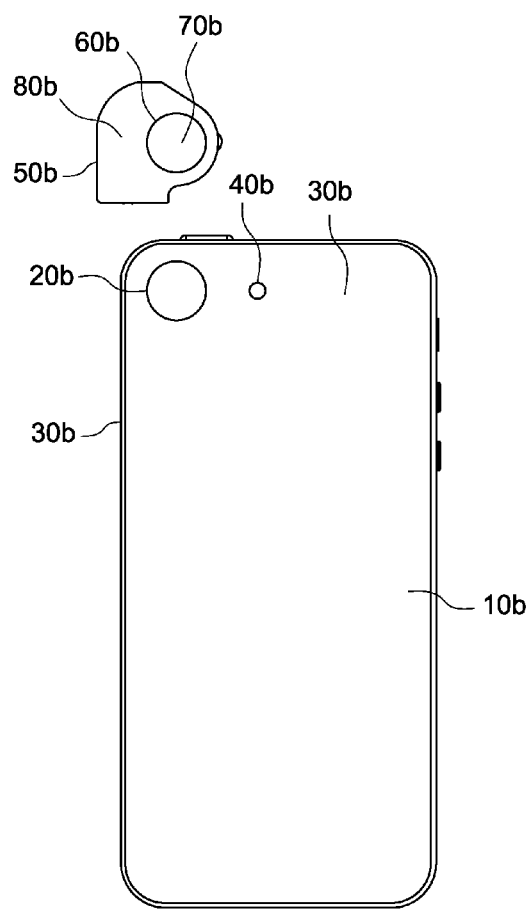
FIG. 5 is a front view of a second preferred embodiment of the present invention in close proximity to a cellular phone.
Figure 5A:
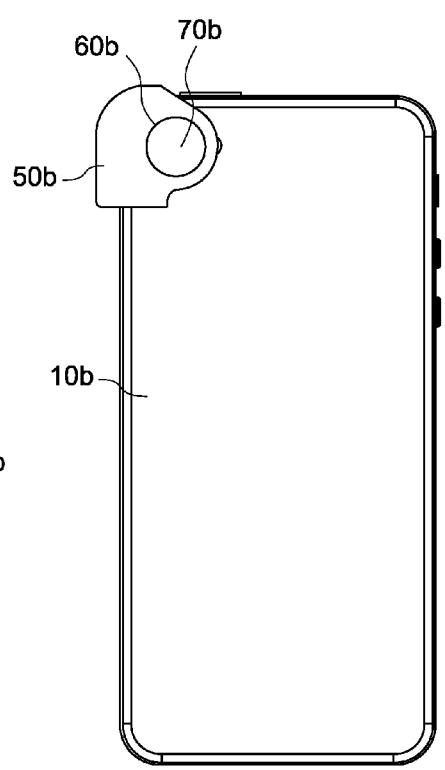
FIG. 5A is a front view of a second preferred embodiment of the present invention in a mated state with a cellular phone.
Figure 6:
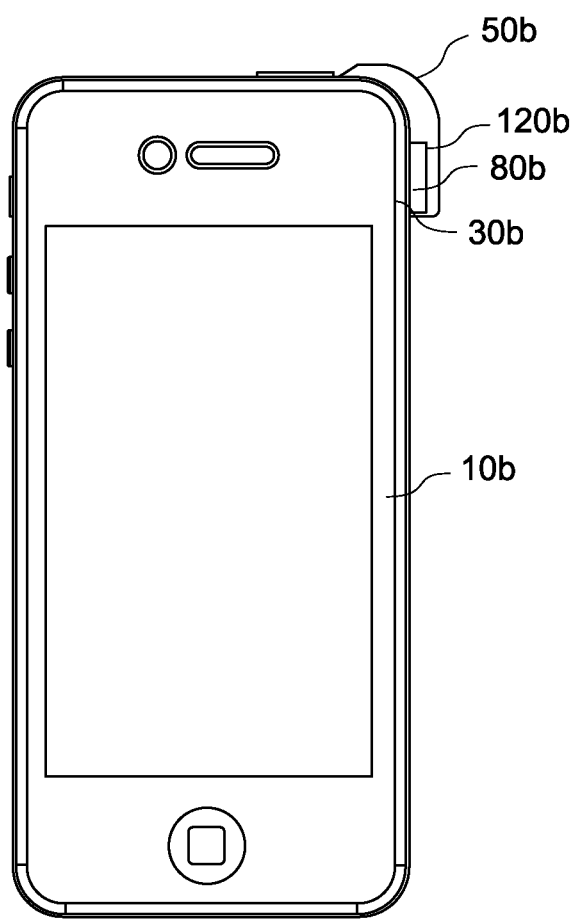
FIG. 6 is a back view of a second preferred embodiment of the present invention in a mated state with a cellular phone.
Figure 7:
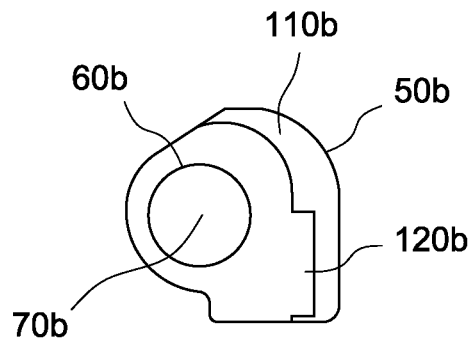
FIG. 7 is a top plan view of a second preferred embodiment of the present invention.
Figure 8:
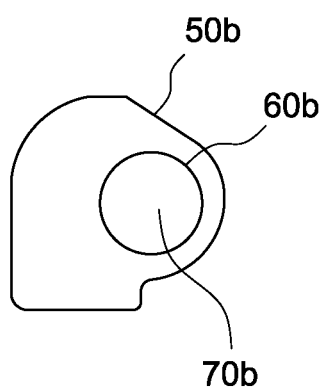
FIG. 8 is a back plan view of a second preferred embodiment of the present invention.
Figures 9, 9A:
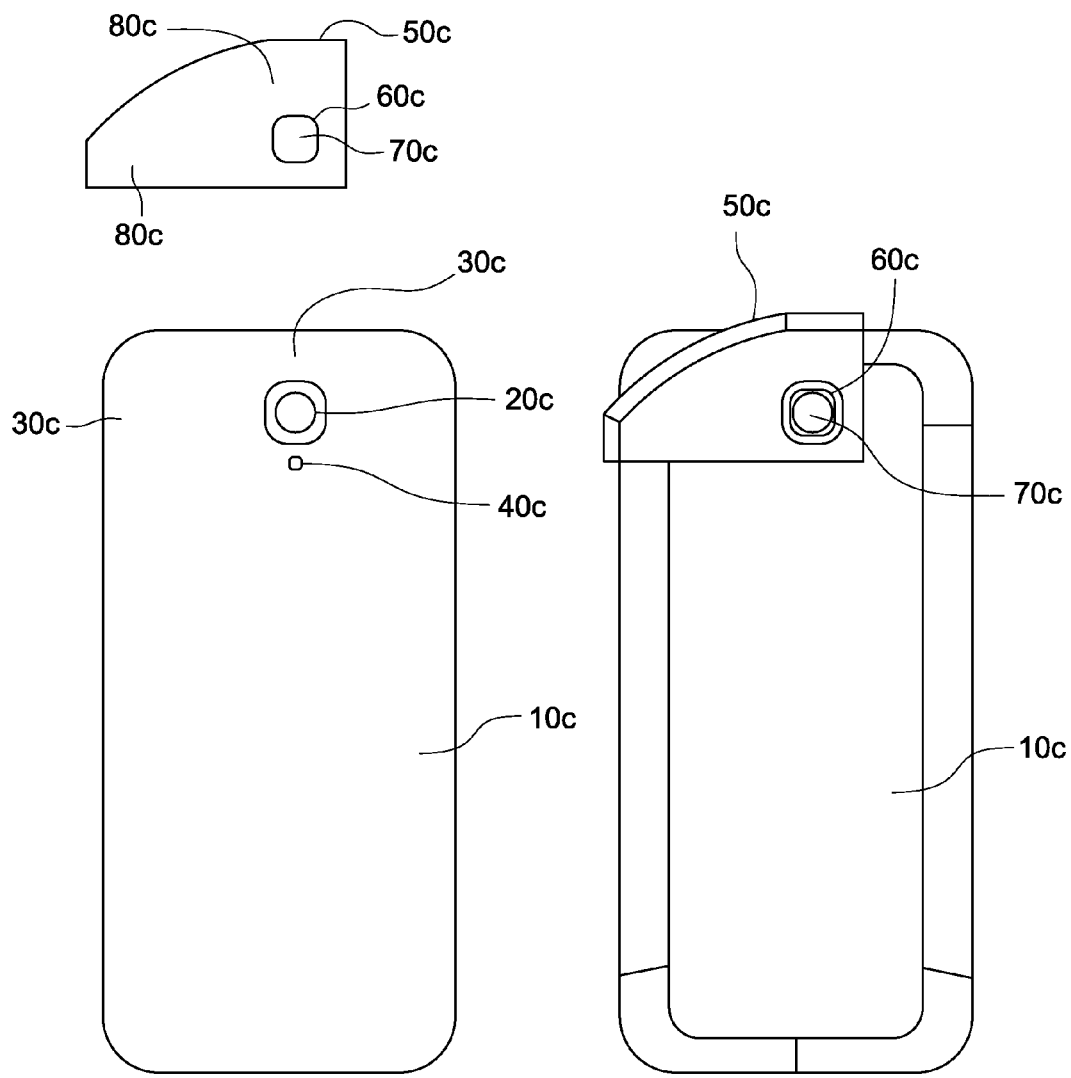
FIG. 9 is a front view of a third preferred embodiment of the present invention in close proximity to a cellular phone.
FIG. 9A is a front view of a third preferred embodiment of the present invention in a mated state with a cellular phone.
Figure 10:
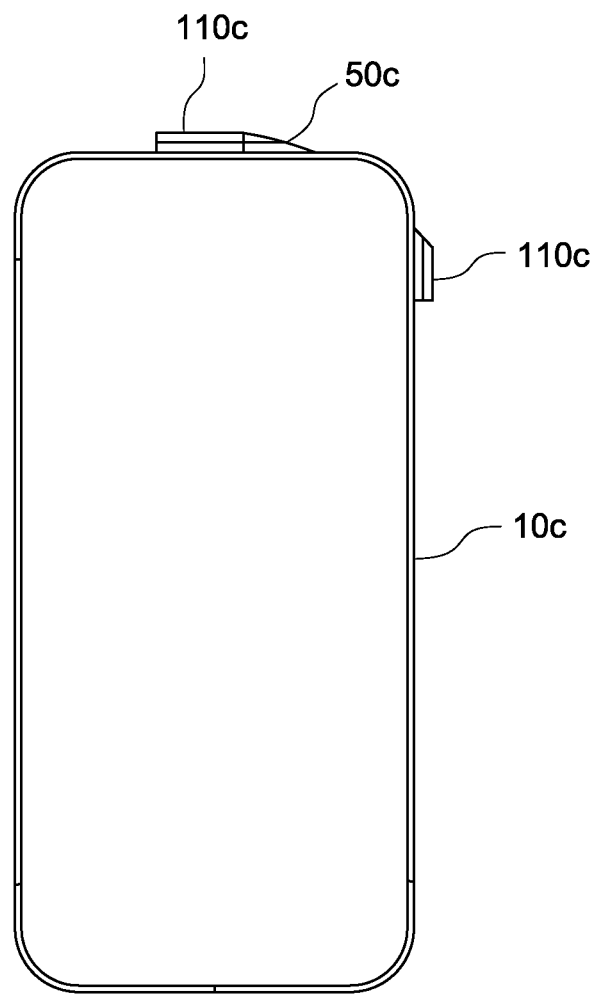
FIG. 10 is a back view of a third preferred embodiment of the present invention in a mated state with a cellular phone.
Figure 11:
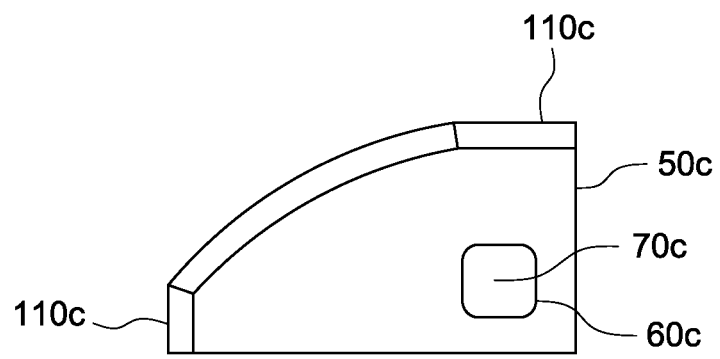
FIG. 11 is a top plan view of a third preferred embodiment of the present invention.

Also, it can be seen that the magnetic portion of the electronic device 30, roughly corresponds to the rear of the speaker assembly of the electronic device 100, which is a common feature of electronic devices and typically is the ideal magnetic portion for mating. FIG. 4 more clearly shows the magnet 80 and the cutout for the magnet 120 in the housing 50. In this first embodiment FIG. 1-4, the housing is shaped to the corner portion of the phone, and thereby aligns the opening of the optical adapter to the camera of the electronic device. This shaped section 110 of the housing is just an illustrative example, but could be straight or curved in two or three dimensions, contingent on the electronic device to which the optical adapter must be mated.

In another preferred embodiment FIG. 5-8, there may be numerous magnetic portion of the electronic device 30b. One example, in addition to a speaker, the magnetic portion can also be a known section of metal with magnetic properties such as an outer trim of metallic material. In this embodiment shown in FIG. 6, by only utilizing the outer trim of metal as the magnetic portion instead of the speaker magnetic portion, the optical adapter can be smaller in size which is advantageous for portability. Therefore, the location and options of the magnetic portion in combination with the design considerations of the optical adapter will determine the ideal shape and size of this presented invention.

The housing is shaped to align the opening to the camera of electronic device, for instance in the first two embodiments; this was accomplished by using of a shaped section 110 and 110b of the housing that was contoured to the corner of a device. However, this can be accomplished by various means, as another example is demonstrated by the third embodiment, FIG. 9-12. In this version of the present invention, there are two shaped sections 110c of the housing 50c that contact with two approximately perpendicular sides. The contact of housing 50c with these two sides of the electronic device 10c, in combination with the magnets 80c, provides attachment and alignment. Therefore, the housing can be shaped to contact or contour with one or more sides of the electronic device, as long as proper alignment is achieved.

Figure 12:
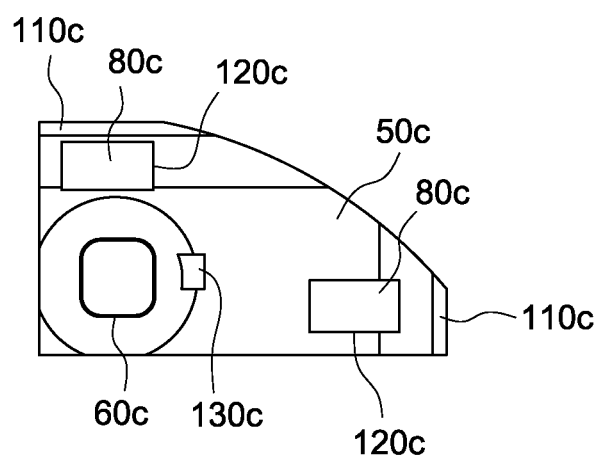
FIG. 12 is a back plan view of a third preferred embodiment of the present invention.
Figure 13:
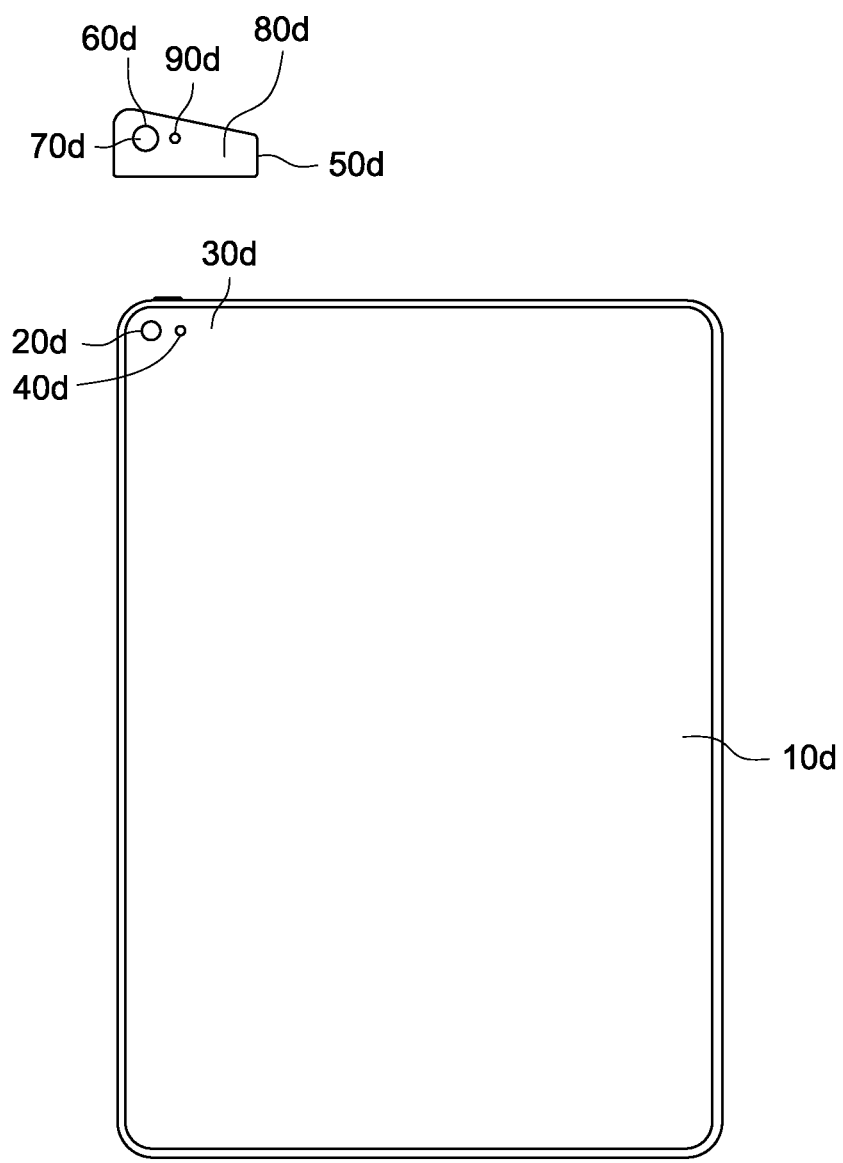
FIG. 13 is a front view of a another preferred embodiment of the present invention in close proximity with a tablet computer.
Figure 13A:
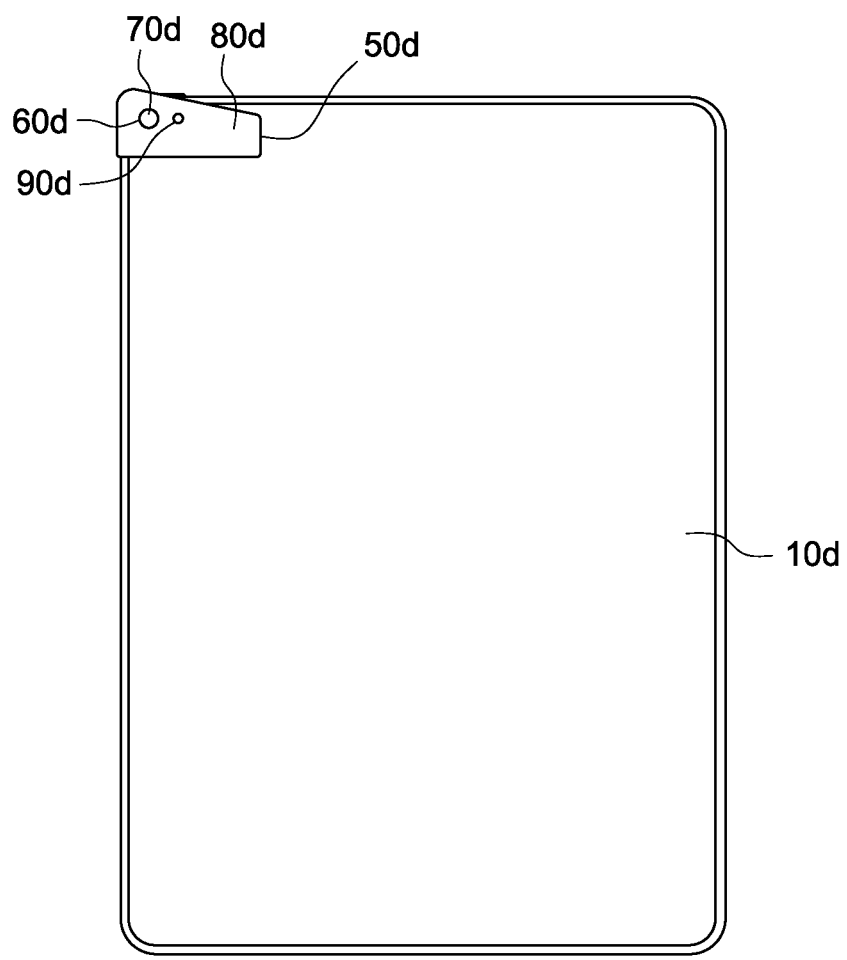
FIG. 13A is a front view of another preferred embodiment of the present invention in a mated state with a tablet computer.
Figure 14:
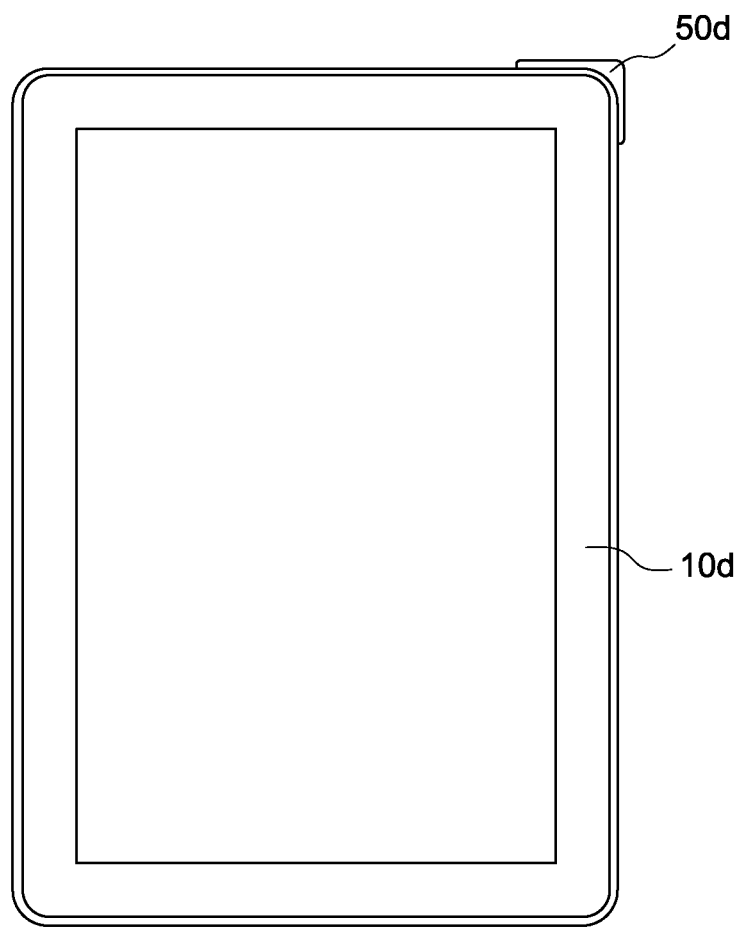
FIG. 14 is a back view of another preferred embodiment of the present invention in a mated state with a tablet computer.

Furthermore, a plurality of magnets may be utilized in order to achieve a stronger hold of the optical adapter to the electronic device. For example, as shown in FIG. 12, two magnets are used that correspond to two magnetic portion of the electronic device. In the case of multiple magnetic portions of the electronic device, the housing could be aligned solely by use of properly placed cutouts in the housing that hold each magnetic element, such that the housing is a contoured surface corresponding generally to the rear face of the electronic device. In this situation, the housing may not require any contact or protrusion that contours the other sides of the electronic device, since the proper locations of the cutouts would be enough to provide alignment with the electronic device. Subsequently, the housing would be shaped to align via the several deliberately placed cutouts for each magnetic element. As a result, a housing shaped to align would require at least two alignment means, specifically, a combination of these elements with allowable repetitions: a physical contact point with a first side of the electronic device, a physical contact point with a second side of the electronic device, and/or a magnetic contact point with a magnetic portion of electronic device.

Also, in the third illustrative embodiment shown in FIG. 9-12, the opening 60c in the housing is rectangular in shape. Instead of alignment being analogous to making two circles concentric, in this case, the mated state aligns the center of this rectangular opening with the center of the camera of the electronic device. The opening 60 in the housing can also be used to mate with any optical component housing, for example a fisheye lens assembly body can be press fit into the opening and may protrude outwards from the outer surface of the housing. The opening can be of any shape or geometry wherein light can still pass through the opening, and such an opening can also be utilized to mount or retain the lens element or lens assembly to the housing. Other additional openings 90 in the housing may also be included such as for the flash element or any other element of the electronic device. If the flash is not required for the optical element or is detrimental in the use of the optical adapter, then it can also be covered as shown in FIG. 5-12.

The optical adapter may optionally have several other features or components depending on the application. First, the optical adapter can have any number of structures that aid in the fixturing of the optical component. In one illustrative example of a preferred embodiment shown in FIG. 12, an additional cutout 130c can be used to provide a mating feature for a lens retaining ring. Other examples include but are not limited to, the housing may having a threaded mount section or bayonet style mounting system for removable optical components, such as a set of lenses that can be attached and replaced depending on the desired use. In this example, the housing can also have other mountings to hold the extra optical components while not in use. Second, the optical adapter can also have connections or hook like protrusions that can be attached to a cord for easier portability. Third, the optical element or assembly can also include components which redirect the light from the flash to the camera area or to another section of the electronic device depending on the application. Another light source such as an LED may also be included in the optical adapter to add light to the system, or to indicate the status or some aspect of the optical component. Also, if the optical element is a laser module, with the use of electronics, it can send out an optical signal which is at least partially reflected and then received by the camera of the electronic device. In these cases, the optical adapter may also have some electronic components such as a PCB or batteries, which control and/or power the optical component or additional light source.

Other embodiments of this device include multiple optical elements, positioned for instance in a stacked, linear or rotary pattern. In the case where multiple alignment positions would be required, the optical adapter can include a housing with adjustable portion to iteratively select the desired optical element or assembly, or with multiple alignment positions. Furthermore, if limited or no information on the magnetic properties of the electronic device is known during the design of the optical adapter, an adjustable portion can be added to the housing, such that it is adaptable and/or settable to a variety of electronic devices. This would require at least a one-time user alignment step, but could be employed on the vast majority of electronic devices having a camera.

The alignment of the opening with the camera of the electronic device is not defined by or does not necessarily require a perfect alignment. In most systems, there is an acceptable working tolerance, as with many optical systems the tolerances of alignment could be several millimeters or greater depending on the application. While the opening of the housing is aligned with the camera of the optical device, the optical element does not necessarily have to be aligned to the camera, as it can also be purposely placed off center with the opening to achieve an interesting, unusual or beneficial effect.

Also, the optical adapter presented herein would also work when the electronic device is in a thin form fitting case. If the magnet is of proper strength, the optical adapter can still attach to the electronic device through the case, with the optical accessory still usable. If the adapter was designed for a bare electronic device, the lens element may be slightly offset from the ideal position; however this may be acceptable in some applications. Moreover, depending on the need, the optical adapter could be designed from the start to attach to an electronic device that is encased in another body. Also, with at least one adjustable segment in the housing that changes the distance between a magnetic element and an optical element, one can achieve a single optical adapter that would be aligned to a variety of electronic devices, with or without a case.

It will thus be seen that the objects set forth above, among those made apparent from the preceding description, are efficiently attained and, since certain changes may be made in the above constructions and methodologies without departing from the spirit and scope of the invention, it is intended that all matter contained in the above description or shown in the accompanying drawings shall be interpreted as illustrative and not in a limiting sense.

While the invention has been particularly shown and described with respect to preferred embodiments thereof, it will be understood by those skilled in the art that changes in form and details may be made therein without departing from the scope and spirit of the invention.

What is claimed is:

1. An optical adapter for an electronic device having at least one camera and at least one display screen, the electronic device having at least a front surface that contains at least the first display screen, a rear surface wherein an optical opening for at least a first rear-facing camera system resides and at least one side surface, the optical adapter comprising:
   at least one optical element or assembly,
   at least one magnetic element, wherein each magnetic element provides a direct magnetic connection between itself and a magnetic section of the electronic device and
   a housing having at least a first opening and having a cutout for each magnetic element,
   wherein the optical adapter aligns at least the first opening of the housing with at least the first rear-facing camera of the electronic device, by at least one magnetic element which is placed to pull the housing in direct contact with at least one surface of the electronic device, and wherein in the aligned state, no portion of the housing is covering at least the first display screen of the electronic device.

2. The device of claim 1, wherein the magnetic mating partner of the optical adapter is an inherently magnetic section of electronic device itself.

3. The device of claim 1, wherein the optical adapter is in a mated state when both the first opening of the optical adapter is aligned with the optical axis of the camera system of the electronic device, and the optical adapter is in magnetic contact with the electronic device.

4. The device of claim 3, wherein in the mated state, the housing does not cover any portion of the front surface of the electronic device.

5. The device of claim 3, wherein the magnetic elements are offset from the magnetic sections of the electronic device when in a mated state, so as to magnetically pull the housing into alignment with the electronic device.

6. The device of claim 3, wherein the mated state is defined by the housing having at least two mutually and approximately orthogonal contact areas with the electronic device, thereby aligning the optical axis of the optical adapter with the optical axis of the camera system of the electronic device.

7. The device of claim 3, wherein the housing has a first surface containing the cutouts for the magnetic elements, such that the first surface is in physical contact with the rear surface of the electronic device while in a mated position.

8. The device of claim 3, wherein the housing is contoured to a corner of the electronic device thereby aligning the optical axis of the optical adapter with the optical axis of the camera system of the electronic device.

9. The device of claim 1, wherein the housing has a second opening for the flash of the electronic device.

10. The device of claim 1, wherein the optical adapter housing has a first opening equal or greater in dimension than the aperture of the camera system of the phone.

11. The device of claim 1, wherein an optical element or the collection of optical elements comprise a macro lens.

12. The device of claim 1, wherein an optical element or the collection of optical elements comprise a fisheye lens.

13. The device of claim 1, wherein an optical element or the collection of optical elements comprise a wide angle lens.

14. The device of claim 1, wherein the device includes means for the user to switch the polarity of at least one magnetic element.

15. The device of claim 1, wherein each magnetic element is a neodymium magnet.

16. The device of claim 1, wherein the housing includes an adjustable portion to adjust the distance of the magnetic element to the optical element.

17. A method to attach an optical element to an electronic device having at least one camera and at least one display screen, the electronic device having at least a front surface that contains at least the first display screen, a rear surface wherein an optical opening for at least a first rear-facing camera system resides, using an optical adapter comprising:
   at least one optical element or assembly,
   at least one magnetic element, wherein each magnetic element provides a magnetic connection between itself and a magnetic section of the electronic device is and
   a housing having at least a first opening and a cutout for each magnetic element,
   wherein the optical adapter aligns at least the first opening of the housing with at least the first rear-facing camera of the electronic device, by at least one magnetic element which is placed to pull the housing in direct contact with at least one surface of the electronic device, and wherein in the aligned state, no portion of the housing is covering at least the first display screen of the electronic device.

18. The method of claim 17, wherein the magnetic mating partner of the optical adapter is the electronic device itself.

19. The method of claim 17, wherein the optical adapter is in a mated state when both the first opening of the optical adapter is aligned with the optical axis of the camera system of the electronic device, and the optical adapter is in magnetic contact with the electronic device.

20. The method of claim 19, wherein in the mated state, the housing does not cover any portion of the front surface of the electronic device.

* * * * *